July 26, 1966
T. C. MADISON
3,263,209
PRESSURE COMPENSATED HYDROPHONE
Filed Jan. 29, 1964
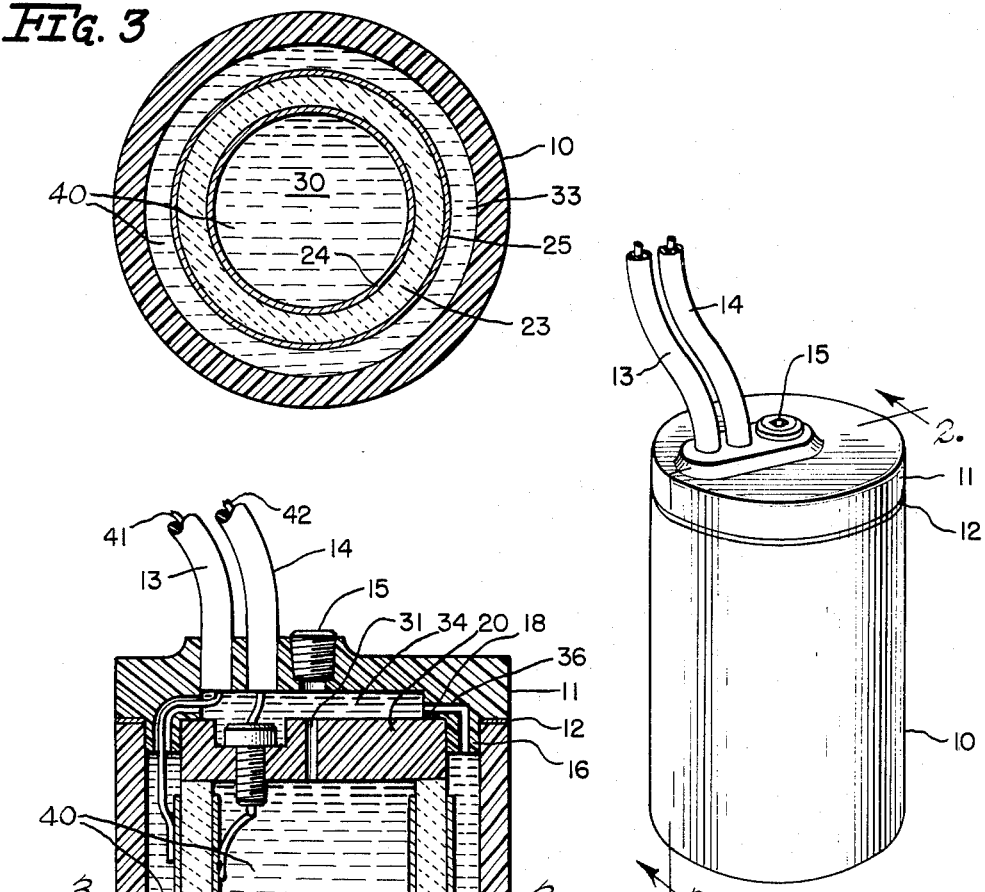
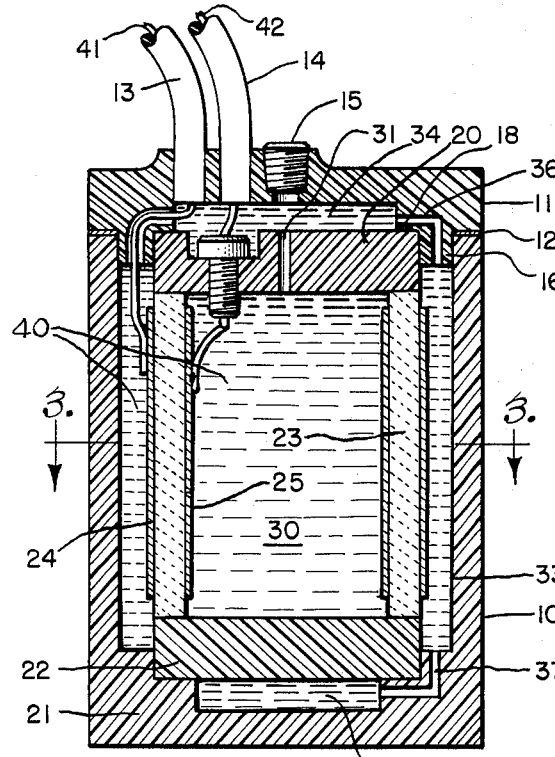
INVENTOR.
Theodore C. Madison
BY
Richard J. Miller
Atty.

United States Patent Office 3,263,209
Patented July 26, 1966

3,263,209
PRESSURE COMPENSATED HYDROPHONE
Theodore C. Madison, Liverpool, N.Y., assignor, by mesne assignments, to the United States of America as represented by the Secretary of the Navy
Filed Jan. 29, 1964, Ser. No. 341,152
6 Claims. (Cl. 340—10)

This invention relates to an improved acoustical transducer and more specifically to hydrophones particularly adapted for deep water reception of acoustical signals.

Hydrophones containing transducer elements of a piezoelectric type have been produced for some years. Many problems are encountered in submerging such hydrophones to extremely deep levels in the ocean since extremely high hydrostatic pressures exist at such depths. These problems are particularly troublesome when using the air filled type of hydrophones. Some liquid filled hydrophones have been developed but these contain many limitations particularly with acoustical reception. These are overcome by the invention disclosed in this application.

It is therefore an object of the invention to provide an improved hydrophone.

It is a further object of this invention to provide an improved hydrophone which has a cylindrical transducing element that does not baffle the low frequency acoustical waves received.

It is yet a further object of this invention to provide a hydrophone whose lower limit of frequency sensitivity is not related to the longitudinal dimensions of the transducer element.

It is still yet a further object of this invention to provide a hydrophone containing a liquid which has the same relative compressibility of the liquid in which it is to operate.

It is still another object of the invention to provide a hydrophone having a transducer element designed as a Helmholtz resonant cavity.

It is still yet a further object of this invention to provide a hydrophone comprising a hollow cylindrical transducer element; a pair of end closure members affixed to the element, one of the members having an orifice extending therethrough; the housing affixedly holding the element and closure members and defining therewith a volume substantially surrounding the element and said members; a liquid filling the element and the volume and flowable through the orifice to equalize the hydrostatic pressure across the element, the compliance of the liquid being equal to or greater than the compliance of the element and closure members.

Other objects, advantages and novel features of the invention will become apparent from the following detailed description of the invention when considered in conjunction with the accompanying drawings wherein:

FIGURE 1 is a perspective view of a transducer embodying the invention;

FIGURE 2 is a cross-sectional view along lines 2—2 of FIGURE 1;

FIGURE 3 is a cross-sectional view along lines 3—3 of FIGURE 2.

The generally cylindrical shaped transducer or hydrophone of FIG. 1 includes a cylindrical housing 10 and end cap 11 sealed to housing 10 by a weld 12. A pair of cables 13, 14 extending through cap 11 and sealed thereto to provide the necessary electrical connection to the transducer element hereinafter described and a sealing plug 15 is provided for insertion of liquids. A hydrophone as shown in FIG. 1 may be lowered to any predetermined depth in the ocean and is supported, as shown in this embodiment of the invention by cables 13, 14. If it is desired to support the transducer by separate means additional structure would be provided for coupling the transducer to a separate cable so that a load would not be placed upon cables 13, 14.

FIGURE 2, a cross-sectional view of FIG. 1 along lines 2—2 of FIG. 1 shows the details of construction of the transducer embodying the invention. Housing 10 and end cap 11 are shown joined by the weld 12. An inner ring or cylindrical portion 16 of end cap 11 is provided for positioning the housing 10 and is made of a sound transmitting plastic. Cap 11 further has a depth recessed portion 18 for rigidly positioning a first end plate 20 and housing 10 has stepped portion 21 for positioning a second end plate 22. Plates 20 and 22 are composed of material which is substantially rigid and serves to isolate acoustical waves as hereinafter described.

A piezoelectric ceramic cylinder 23 is held in position by end plates 20, 22 and has mounted thereon a pair of electrodes 24, 25. The cylinder 23, and end plate 20 and end plate 22 define a cavity or first volume isolated from the rest of the transducer except for an orifice 31 in end plate 20. End plates 20, 22 and cylinder 23 define with housing 10 and end cap 11 a plurality of cavities or volumes 32, 33 and 34. The cavities 32, 33, and 34 are interconnected by passageways 36 and 37 that allow for free flow therethrough of a liquid filling 40 which completely fills cavities 30, 32, 33 and 34.

A pair of wires 41, 42 in cables 13, 14 are connected to electrodes 24, 25 for transmitting a signal generated by the cylindrical element 23 in response to receipt of an acoustic wave to a remotely placed (not shown) circuit for indicating such receipt.

Orifice 31 is selected in conjunction with the volume of cavity 30 to provide a Helmholtz cavity which, by proper selection of component sizes including the length and diameter of element 23, can produce a resonant or non-resonant hydrophone or transducer. The resonant Q can be controlled over a wide range, low frequencies can be cut off whenever desired on non-resonant units and in general a great flexibility of design is provided.

In operation a transducer or hydrophone embodying the invention can be submerged in water to a predetermined depth. As the transducer descends increased hydrostatic pressure on housing 10 tends to compress the housing inwardly increasing the pressure within cavities or volumes 32, 33 and 34. Oil, 40 or other material having a compressibility or compliance substantially equal to or greater than that of the media into which the transducer is being submerged, in this case sea water, will transmit such increase in pressure through the passageways 36, 37 and orifice 31. Thus, the pressure in cavity 30 is equalized as is the pressure in the other cavities to that of the surrounding water. Hence, there is no substantial hydrostatic gradient across the cylindrical member 23 and it is ready for receipt of acoustical signals transmitted through the water.

When such a signal is received periodic increases and decreases of pressure are experienced at the housing 10 corresponding to the frequency of the received signal. These pressure variations are transmitted to the fluid in the cavities 33, 34 and 32. The diameter of orifice 31 viscosity and compliance of the liquid are preselected so that these variations in pressure at the acoustical frequencies are not translated to cavity 30. Due to the limit to flow of the liquid 40 through the orifice 31 substantially no liquid will be transferred to the inner cavity 30 before a change in pressure would cause the liquid to flow out of the cavity. Thus, the selection of the diameter or orifice 31 is determined by the frequency range to be received by the transducer.

The construction as shown in FIGS. 1, 2 and 3 in the embodiment of the invention provides a transducer which has a liquid medium surrounding both sides of the active cylindrical element allowing for an equalization of pressure thereacross. In conjunction therewith the acoustically stiff end plates 20, 22 further isolation of the cylinder is provided.

I claim:
1. An electroacoustic transducer, comprising:
   (a) a hollow cylindrical piezoelectric transducer;
   (b) first and second plastic end members rigidly affixed to said transducer and defining therewith a first volume;
   (c) a cylindrical acoustical signal transmissive housing supporting said first and second end members and defining a second volume with said transducer, said end members defining with said housing third and fourth volumes;
   (d) an orifice extending through one of said end members and interconnecting said first and third volumes;
   (e) passageways interconnecting said second volume with said third and fourth volumes; and
   (f) a liquid having a compliance substantially equal to the compliance of said end members and said transducer filling said first, second, third and fourth volumes, said orifice and said passageways.

2. An electroacoustic transducer, comprising:
   (a) a hollow cylindrical piezoelectric transducer;
   (b) first and second plastic end members rigidly affixed to said transducer and defining therewith a first volume;
   (c) a cylindrical acoustic signal transmissive housing supporting in conjunction with an end cap said first and second end members and defining a second volume with said transducer, said end members defining with said housing and said end cap third and fourth volumes;
   (d) an orifice extending through one of said end members and interconnecting said first and third volumes;
   (e) passageways interconnecting said second volume with said third and fourth volumes; and
   (f) a liquid having a compliance substantially equal to the compliance of said end members and said transducer filling said first, second, third and fourth volumes, said orifice and said passageways, said orifice having a cross-sectional area for allowing equalization of hydrostatic pressure in said first and third volumes and for preventing any substantial flow of said liquid between said first and third volumes when acoustic signals are received.

3. An improved electrostatic hydrophone having four cavities, comprising:
   (a) a hollow cylindrical sound transmissive housing having an open end and a longitudinal axis;
   (b) an end cap sealed to said open end and forming a closed volume with said housing;
   (c) a first end member;
   (d) a first stepped portion in said housing for supporting said first end member normal to said axis; said housing and first end member forming a fourth cavity;
   (e) a second end member;
   (f) a second stepped portion in said end cap for supporting said second end member normal to said axis; said cap and third end member forming a second cavity;
   (g) a hollow cylindrical piezoelectric element supported between said first and second end members, said element and first and second end members forming a first cavity; said element and housing forming a second cavity;
   (h) first and second electrodes on said element;
   (i) electric signal transmissive means connected to said electrodes to transmit signals produced by said element through said housing;
   (j) capillary passageways interconnecting said second and fourth cavities, said second and third cavities and said first and third cavities; and
   (k) a liquid filling said first, second, third, and fourth cavities and said passageways having a compliance equal to or greater than said members and elements, said liquid capable of transmitting hydrostatic pressures substantially uniformly throughout said hydrophone and capable of transmitting received acoustical signals to said piezoelectric element.

4. The hydrophone of claim 3 wherein said element generates signals in response to acoustical signals received through said housing.

5. The hydrophone of claim 4 wherein a filling hole and plug are provided in said end cap.

6. The hydrophone of claim 5 wherein support means are provided on said end caps for suspending said hydrophone in water.

References Cited by the Examiner

UNITED STATES PATENTS 2,977,572  3/1961  Pope _____ 340—10
3,108,247  10/1963  Harris _____ 340—8

CHESTER L. JUSTUS, Primary Examiner.

G. M. FISHER, Assistant Examiner.